United States Patent
Teurlinx et al.

(10) Patent No.: US 10,492,505 B2
(45) Date of Patent: Dec. 3, 2019

(54) DEVICE AND METHOD FOR PREPARING THE EVISCERATION OF BEHEADED SLAUGHTERED POULTRY

(71) Applicant: MAREL STORK POULTRY PROCESSING B.V., Boxmeer (NL)

(72) Inventors: Engelbertus Johannes Jacobus Teurlinx, Stevenbeek (NL); Roger Pierre Hubertus Maria Claessens, Nijmegen (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 16/083,293

(22) PCT Filed: Feb. 22, 2017

(86) PCT No.: PCT/NL2017/050103
§ 371 (c)(1),
(2) Date: Sep. 7, 2018

(87) PCT Pub. No.: WO2017/155388
PCT Pub. Date: Sep. 14, 2017

(65) Prior Publication Data
US 2019/0069566 A1    Mar. 7, 2019

(30) Foreign Application Priority Data

Mar. 8, 2016  (NL) ..................................... 2016393

(51) Int. Cl.
   *A22C 21/00*   (2006.01)
   *A22C 21/06*   (2006.01)

(52) U.S. Cl.
   CPC .......... *A22C 21/06* (2013.01); *A22C 21/0053* (2013.01); *A22C 21/0092* (2013.01)

(58) Field of Classification Search
   CPC . A22C 21/00; A22C 21/0038; A22C 21/0046; A22C 21/06
   (Continued)

(56) References Cited

U.S. PATENT DOCUMENTS 1,986,195 A    1/1935  Griffin
3,798,708 A    3/1974  Scheier
(Continued)

FOREIGN PATENT DOCUMENTS

EP         1 011 341 A1    6/2000
WO      WO 97/25872 A2    7/1997
(Continued)

OTHER PUBLICATIONS

Dutch Search Report, issued in Priority Application No. 2016393, dated Nov. 15, 2016.
(Continued)

*Primary Examiner* — Richard T Price, Jr.
(74) *Attorney, Agent, or Firm* — Birch, Stewart, Kolasch & Birch, LLP

(57) ABSTRACT

The present invention relates to a pre-evisceration device and a method for preparing the evisceration of beheaded slaughtered poultry, wherein the viscera pack is to be eviscerated from the vent end. A neck slitting knife makes a neck slit along the neck at the breast side of the poultry. A pre-evisceration release tool is adapted to be inserted via the neck slit between the esophagus and trachea and the naturally surrounding tissue, and to be moved along the neck to loosen at least part of the trachea and esophagus adhering to the neck. The pre-evisceration tool releases, prior to evisceration, part of the esophagus and trachea at the neck side of the crop between a position adjacent the crop, at the neck side thereof, and the neck opening.

16 Claims, 3 Drawing Sheets

(58) Field of Classification Search
 USPC .......................................................... 452/106
 See application file for complete search history.

(56) References Cited

U.S. PATENT DOCUMENTS

| | | | |
|---|---|---|---|
| 5,186,679 A | | 2/1993 | Meyn |
| 5,913,720 A | | 6/1999 | Scott et al. |
| 5,938,517 A | * | 8/1999 | Vineyard ............... A22C 21/06 |
| | | | 452/120 |
| 6,328,645 B1 | | 12/2001 | Martin et al. |
| 8,585,473 B2 | * | 11/2013 | Van Den Nieuwelaar .................. |
| | | | A22C 21/0092 |
| | | | 452/127 |
| 8,900,039 B2 | * | 12/2014 | Drabbels ............ A22C 21/0046 |
| | | | 452/116 |

FOREIGN PATENT DOCUMENTS

| | | |
|---|---|---|
| WO | WO 98/44806 A1 | 10/1998 |
| WO | WO 01/52659 A1 | 7/2001 |

OTHER PUBLICATIONS

International Search Report, issued in PCT/NL2017/050103, dated Jun. 21, 2017.
Written Opinion of the International Searching Authority, issued in PCT/NL2017/050103, dated Jun. 21, 2017.

\* cited by examiner

DEVICE AND METHOD FOR PREPARING THE EVISCERATION OF BEHEADED SLAUGHTERED POULTRY

BACKGROUND OF THE INVENTION

The invention relates to a device and method for preparing the evisceration of beheaded slaughtered poultry.

In poultry processing plants slaughtered and defeathered poultry is conveyed to an evisceration device for eviscerating beheaded slaughtered poultry having a carcass with a body cavity having a breast side and a back side, as well as a vent end where the vent is or was located, and at least part of the neck with a neck opening at a neck end thereof, the slaughtered poultry having a viscera pack including heart, lungs, liver, stomach, intestines, trachea (windpipe) and esophagus (gullet) including crop, including a part of the esophagus and trachea at the neck side of the crop. In order to eviscerate, the body cavity is opened at the vent end, which vent end opening is made by a separate vent end opening device upstream of the evisceration device or a vent end opening device that is integrated with the evisceration device.

In many common evisceration methods the carcass is retained in an orientation with the neck end downwards, e.g. in an approximately vertical orientation or retained in a tilted orientation. This neck end downward orientation is more practical than an orientation wherein the vent side is oriented downward. The latter orientation causes, or may cause, the viscera pack (or a portion thereof) to spill uncontrolled from the body cavity which is not, or hardly, the case when the neck downward orientation is used. Also the vent end downward orientation requires a rather complex retention structure of the evisceration device as the carcasses are commonly conveyed hanging from their legs. An example of a vent end downward orientation is e.g. found in U.S. Pat. No. 6,328,645.

In common evisceration methods an eviscerating tool is entered into the body cavity of the retained carcass via the opened vent end. The eviscerating tool is dipped deeper into the body cavity in a path along the breast side of the body cavity so that the front end thereof passes the viscera pack at least till beyond the liver, commonly till below the heart, e.g. to clamp the esophagus (gullet) close to the neck end by means of a clamp at the front end of the eviscerating tool if present. Then the eviscerating tool is withdrawn and thereby the viscera pack is lifted out of the body cavity.

An early example of an evisceration device for automated removal of the viscera pack is disclosed in U.S. Pat. No. 3,798,708. Herein an evisceration tool is dipped into the body cavity and passed in an arc along the breast side of the body cavity to avoid damage to internal organs. With reference to FIGS. 15 and 16 therein an evisceration tool is disclosed embodied as a loop having parallel legs connected by a bight forming the front end of the tool.

The eviscerating tool is dipped into the body cavity until the bight reaches the lungs, which are deep in the cavity close to the neck end. Then the eviscerating tool is withdrawn along the backbone and in this process the gizzard and the rest of the viscera pack is trapped between the legs of the tool. The further withdrawal causes the entire viscera pack to be removed from the body cavity.

In a bird's digestive system, the crop is an expanded, muscular pouch near the gullet or throat. It is a part of the digestive tract, essentially an enlarged part of the esophagus. The crop is used to temporarily store food. Generally, poultry that is about to be slaughtered is kept void of food for some time, as a result of which the crop of slaughtered poultry is supposed to be empty. The crop is generally positioned in the décolletage between the breast fillets, adjacent the tip of the breastbone, and hence also adjacent the furcular. The crop itself is fragile and vulnerable, whereas both ends of the crop are firmly connected to the esophagus and trachea: one end adjacent the body cavity and opposed thereof at the neck side. In general, the evisceration tool contacts the crop connection at the end adjacent the body cavity.

The prior art evisceration methods and devices are found to be unsatisfactory in view of contamination by remains and contents of the crop. At present day operating speeds of eviscerating devices are very high and losses due to crop contamination are witnessed in the range between 30 and 60 percent.

SUMMARY OF THE INVENTION

It is therefore an object of the present invention to propose measures that allow for a reduction of contamination by remains and contents of the crop in the evisceration process.

It is a further object of the present invention to propose such measures that may be readily combined with existing and currently widely used evisceration tools that are moved from the vent end along the breast side of the body cavity, e.g. disclosed in U.S. Pat. No. 5,186,679 (Meyn), WO97/25872 (Johnson), WO01/52659 (Stork), and EP 1 011 341 (Lindholst).

The invention provides a pre-evisceration device which comprises a neck slitting knife for making a neck slit along the neck at the breast side of the poultry; and a pre-evisceration release tool for releasing the at least part of the esophagus and trachea at the neck side of the crop between a position adjacent the crop, at the neck side thereof, and the neck opening, prior to evisceration, the pre-evisceration release tool being adapted to be inserted via the neck slit between the esophagus and trachea and the naturally surrounding tissue, and to be moved along the neck to loosen the trachea and esophagus adhering to said neck.

The invention further relates to a method for preparing the evisceration of beheaded slaughtered poultry having a carcass with a body cavity having a breast side and a back side, as well as a vent end where the vent is or was located, and at least part of the neck with a neck opening at a neck end thereof, the slaughtered poultry having a viscera pack including heart, lungs, liver, stomach, intestines, trachea and esophagus including crop, including a part of the esophagus and trachea at the neck side of the crop; the method comprising the steps of:
  making a neck slit along the neck at the breast side of the poultry;
  inserting a pre-evisceration release tool via the neck slit between the esophagus and trachea and the naturally surrounding tissue;
moving the pre-evisceration release tool along the neck, thereby loosening said at least part of the trachea and esophagus adhering to said neck between a position adjacent the crop, at the neck side thereof, and the neck opening.
  To eviscerate the poultry, the method is followed by
    inserting an eviscerating member into the vent end to eviscerate the viscera pack including the esophagus with the crop and the trachea.
  It has been found that releasing said part of the esophagus and trachea at the neck side of the crop prior to evisceration prevents contamination by the remaining of crop and contents of the crop in the poultry during subsequent evisceration by the evisceration member. It is noticed that neither the neck slitting knife nor the pre-evisceration release tool has interaction with the crop itself. Hence, the pre-evisceration device of the invention includes tools to prevent contamination by the remaining of crop and contents of the crop. These tools interact with the neck and said part of the esophagus and trachea at the neck side of the crop between a position adjacent the crop, at the neck side thereof, and the neck opening, while keeping the crop intact, i.e. without damaging the crop.

The invention is primarily proposed for the evisceration of chicken but other poultry, e.g. duck, is also envisaged.

It is noticed that contamination by remains and contents of the crop in the evisceration process may also be prevented by removing the crop prior to eviscerating the viscera from the body cavity, such as heart, lung, liver, intestines. Crop removal from an opening at the neck end of the carcass is well known, however, such crop removal frequently results in 'milking the crop-contents', as a result of which contents of the crop still enter the body cavity and cause contamination. A further disadvantage is that it is advantageous to eviscerate by clamping the esophagus above the crop, as this routine is known to remove the entire viscera package at once. Once crop and esophagus above the crop are removed, it is more difficult to grasp the entire viscera package. A further disadvantage is that possibly by removing crop and esophagus, the trachea is still left and has to be removed in a separate step. Alternatively, it is also conceivable that the crop is removed by removing the neck and neck skin, while food safety regulations frequently require the neck to be present.

According to the invention, the pre-evisceration device comprises a neck slitting knife for making a neck slit along the neck at the breast side of the poultry. The neck slit is made to allow insertion of the pre-eviscerating release tool, and movement of the tool along the neck to loosen said at least part of the trachea and esophagus adhering to said neck. The neck slit may extend perpendicular to the direction of the neck, or more advantageous in the direction of the neck. Preferably, but not necessarily, the neck slit extends to the neck opening at the neck end. Likewise, preferably, but not necessarily, the neck slit extends to a position adjacent the crop, e.g. essentially above the crop. Such a neck slit is not a damaging cut, and can hence be applied without consequences for (food safety) regulations.

In a preferred embodiment, neck slitting knife is adapted to make a slit from the neck opening in the direction of the neck towards a position on the breast essentially above the crop. Such a slit facilitates insertion and movement of a pre-eviscerating release tool.

According to the invention, the pre-evisceration device further comprises a pre-evisceration release tool for releasing said part of the esophagus and trachea at the neck side of the crop between a position adjacent the crop, at the neck side thereof, and the neck opening, prior to evisceration. The pre-evisceration release tool is adapted to be inserted via the neck slit between the esophagus and trachea on the one hand, and the naturally surrounding tissue on the other hand, and to be moved along the neck to loosen said at least part of the trachea and esophagus adhering to said neck. By moving the release tool, connections between the trachea and esophagus and naturally surrounding tissue is broken.

In embodiments, the pre-evisceration release tool is embodied as a scraper. An alternative release tool e.g. comprises a jet, e.g. a water or air jet. In possible embodiments wherein the release tool is embodied as a scraper, it is conceivable that the scraper comprising two scraping members, possible parallel scraping members, e.g. a scraping member to release said at least part of the trachea, and a second scraping member to release said at least part of the esophagus.

In embodiments, the pre-evisceration release tool is adapted to be moved from a position adjacent the crop along the neck to the neck opening. In alternative embodiments, the pre-evisceration release tool is adapted to be moved in opposite direction, i.e. the from the neck opening along the neck to a position adjacent the crop. It is also conceivable that the pre-evisceration release tool is adapted to perform multiple movements, e.g. a back-and-forth movement, or that the pre-evisceration release tool comprises multiple members movable in opposed directions. In embodiments, a drive is provided to move said pre-evisceration release tool along the neck to loosen said at least part of the trachea and esophagus adhering to said neck.

In embodiments, the pre-evisceration device is further provided with a neck positioning tool to position the neck at least prior to insertion of the pre-evisceration release tool, possibly prior to making the neck slit. Such a neck positioning tool may assist in the accuracy and/or speed of the release of said at least part of the esophagus and trachea.

In a possible method, evisceration is followed by removing the neck skin, and/or harvesting neck meat. A neck positioning tool may further facilitate such a consecutive method step.

In embodiments, as is preferred, in the pre-evisceration device the slaughtered poultry is suspended by its legs in a shackle with the neck hanging downwards, i.e. the carcass is retained in an orientation with the neck end downwards. Preferably, the slaughtered poultry is conveyed in a conveyor, preferably a shackle conveyor. It is noticed that this orientation is preferred, in particular during evisceration by the evisceration tool. However, in embodiments other orientation of the slaughtered poultry are allowed, e.g. laying on a conveyor belt or supported below its wings. It is conceivable that in the pre-evisceration device of the invention, different orientations of the slaughtered poultry are allowed during the method steps: for example, it is conceivable that the step of making a neck slit along the neck at the breast side of the poultry is done while the slaughtered poultry is laying down, e.g. on a conveyor belt. Alternatively, or in addition, it is conceivable that the slaughtered poultry is supported with the legs hanging downwards, e.g. by an overhead shackle conveyor comprising hooks for supporting the wings of the slaughtered poultry, e.g. during insertion and movement of the pre-evisceration release tool.

In embodiments wherein the slaughtered poultry further comprises wings and shoulders, the pre-evisceration device preferably further comprises shoulder lifters to lift the shoulders prior to inserting the pre-evisceration release tool, and preferably prior to making the neck slit. As indicated above, the crop is generally positioned in the décolletage between the breast fillets. Hence, by lifting the shoulders, the breast fillets are moved apart increasing the accessibility of the crop, and the esophagus and trachea at the neck side of the crop.

Advantageously, multiple pre-evisceration release tools are integrated in a carousel machine around its circumference. As such, at high speed the parts of the esophagus and trachea of multiple slaughtered poultry can be released. Possibly, the pre-evisceration release tools and neck slitting knifes are integrated in a single machine, e.g. a carousel machine. Advantageously, a single machine, e.g. carousel machine is provided comprising neck slitting knifes, pre-evisceration release tools and eviscerating devices.

The present invention further relates to a pre-evisceration release tool for preparing the evisceration of beheaded slaughtered poultry having a carcass with a body cavity having a breast side and a back side, as well as a vent end where the vent is or was located, and at least part of the neck with a neck opening at a neck end thereof, the slaughtered poultry having a viscera pack including heart, lungs, liver, stomach, intestines, trachea and esophagus including crop, including a part of the esophagus and trachea at the neck side of the crop;

wherein the viscera pack is to be eviscerated from the vent end;

wherein the slaughtered poultry is conveyed in a shackle conveyor;

the pre-evisceration release tool being suitable for releasing, prior to evisceration, said part of the esophagus and trachea at the neck side of the crop between a position adjacent the crop, at the neck side thereof, and the neck opening, the pre-evisceration release tool being adapted to be inserted via a neck slit between the esophagus and trachea and the naturally surrounding tissue, wherein a drive is provided to move said pre-evisceration release tool along the neck to loosen said at least part of the trachea and esophagus adhering to said neck.

Such a pre-evisceration release tool is preferably a pre-evisceration release tool used in a pre-evisceration device according to the invention, and is advantageously embodied according to one or more preferred embodiments.

Advantageously, the pre-evisceration release tool is a scraper, e.g. comprising two parallel scraping members. Advantageously, pre-evisceration release tool is adapted to be moved from a position adjacent the crop, at the neck side thereof, along the neck to the neck opening. Advantageously, multiple pre-evisceration release tools are integrated in a carousel machine around its circumference.

BRIEF DESCRIPTION OF THE DRAWINGS

The invention will now be explained with reference to the drawings, in which in a non-limiting manner exemplary embodiments of the invention are illustrated. In the drawings.

In these examples the poultry is a chicken, but the invention is applicable to other poultry, e.g. duck, as well.

DETAILED DESCRIPTION OF THE PREFERRED DESCRIPTION

Figure 1:
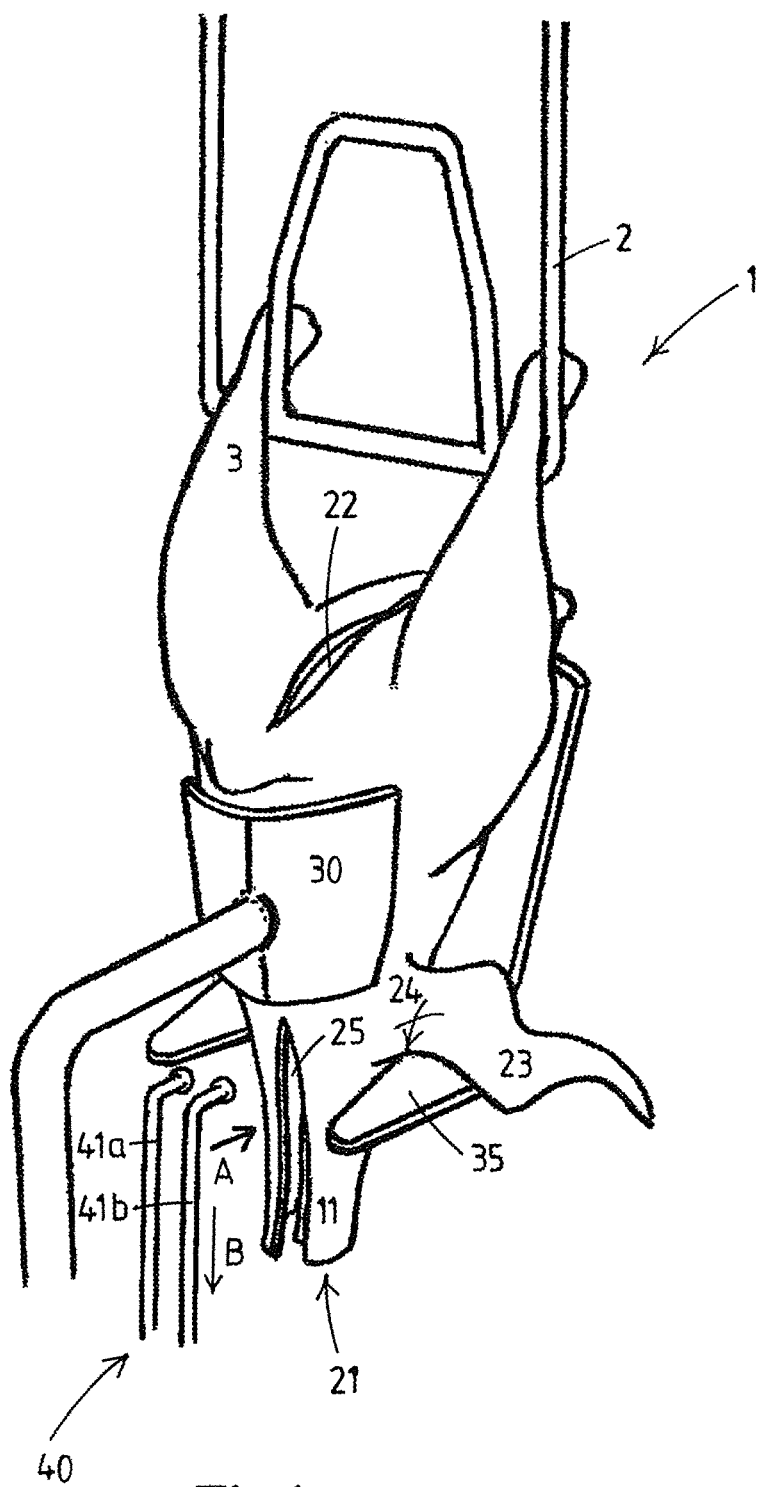
FIG. 1 shows perspective view an example of a pre-evisceration release tool according to the invention.

The FIG. 1 shows in perspective view a beheaded slaughtered and defeathered chicken 1 which is retained or suspended by its legs in a poultry shackle 2 as is known in the art.

Figure 2:
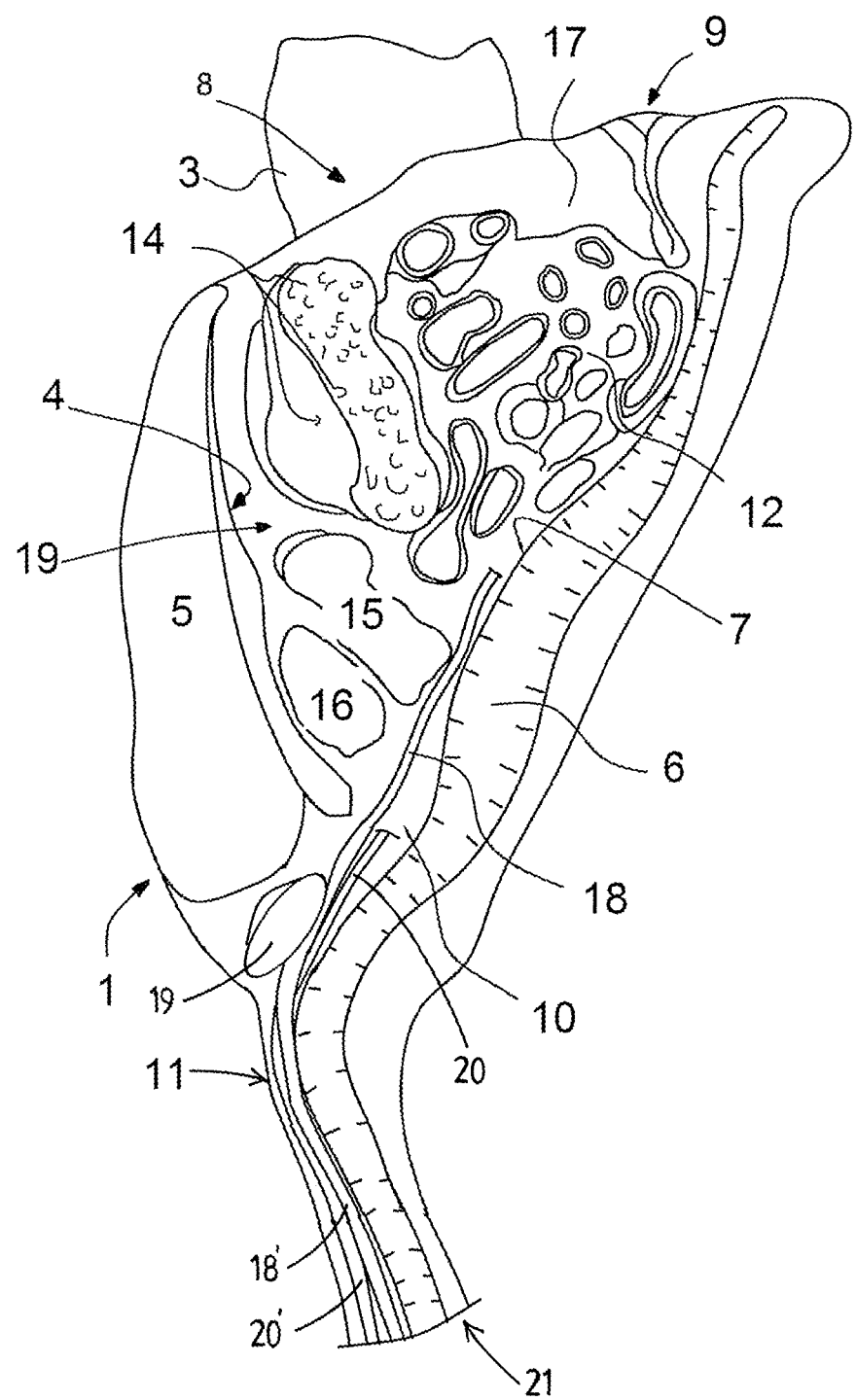
FIG. 2 illustrates in cross-section the carcass of the chicken to be eviscerated, FIG. 3 schematically illustrates a pre-evisceration device according to the invention.

In order to facilitate the understanding of the present invention the FIG. 2 shows a cross-section of a slaughtered chicken 1 in neck down orientation. The FIG. 2 shows the carcass and the location within the body cavity thereof of the organs as discussed herein. The FIG. 2 has been obtained by deep-freezing a slaughtered chicken whilst suspended from its legs and cutting the frozen chicken in half.

In FIG. 2 the following parts of the chicken carcass 1 are provided with reference numerals:

leg 3
breast side 4 of the body cavity
breast fillet meat 5
vertebra 6,
back side 7 of body cavity
vent end 8 of body cavity
vent or cloaca 9
neck end 10 of body cavity
neck 11
neck opening 21
intestines 12
gizzard 14
liver 15
heart 16
belly fat 17
esophagus 18, with part 18' at neck side of the crop
crop 19
trachea 20, with part 20' at neck side of the crop.

The gizzard 14 is depicted here with food remnants, e.g. of seeds, still present in the gizzard. The crop 19 is depicted slightly expanded.

The entirety of the organs is identified as viscera pack with reference numeral 19. Most of the viscera pack 19 is located in the body cavity of the carcass 1. The carcass has a breast 5 at the left-hand side of the FIGS. 1 and 2. The body cavity has a breast side 4 and a back side 7, in FIGS. 1 and 2 corresponding to the left-hand side and the right-hand side of the cavity.

As can be seen the chicken is retained in a neck down orientation, so that the vent end 8—where the vent 9 is or was located—is at the top of the body cavity and the neck end 10 at the lower end of the body cavity.

The FIG. 2 shows the carcass 1 with the vent end side 8 open. As is common in the art the body cavity will be opened at the vent end, e.g. by an upstream vent opening device prior to the start of the evisceration process. This vent opening 22 is partly visible in FIG. 1.

Figure 3:
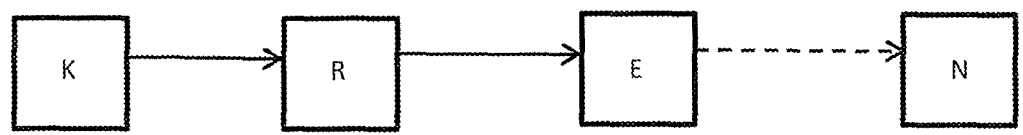

In FIG. 3 an eviscerating device according to the present invention is highly schematically represented. The device comprises sequentially:

a neck slitting knife K for making a neck slit along the neck at the breast side of the poultry;

a pre-evisceration release tool R for releasing said part of the esophagus 18' and trachea 20' at the neck side of the crop 19 between a position adjacent the crop, at the neck side thereof, and the neck opening 21, an eviscerating device E comprising an evisceration tool for eviscerating the viscera pack from the vent end 8, an optional neck skin remover and/or neck meat harvester N.

In FIG. 1 a possible embodiment of a pre-evisceration release tool 40 for releasing said part of the esophagus and trachea at the neck side of the crop between a position adjacent the crop, at the neck side thereof, and the neck opening 21 is shown. A neck slit 25 is visible, extending at the breast side of the poultry between a position essentially above the crop and the neck opening 21.

According to a preferred embodiment of the present invention, a breast fixation device 30 is provided, resting against the breast fillets 5, to define the position of the beheaded slaughtered poultry. The position is further defined by shoulder lifters 35, lifting shoulders 24 of wings 23 prior to inserting the pre-evisceration release tool, and preferably also prior to making the neck slit. By lifting the shoulders, the accessibility of the crop and part of the trachea and esophagus at the neck side of the crop is increased.

The pre-evisceration release tool 40 as visible in FIG. 1 comprises two parallel scraping members 41a, 41b. In the shown embodiment, the scraping members are embodied as rod-shaped elements having a short right-angled end part with a thickened and rounded end. Alternative configurations are also conceivable, e.g. of a one-part construction.

In FIG. 1 it is indicated with arrow A how the scraping members 41a, 41b are being inserted via the neck slit 25 between said part of the esophagus 18' and said part of the trachea 20' and the naturally surrounding tissue in the neck 11. In the shown embodiment, the scraping members 41a, 41b are inserted at a position adjacent the neck side of the crop.

With arrow B in FIG. 1 it is indicated how the scraping members 41a, 41b are movable along the neck 11 from the position adjacent the neck side of the crop towards the neck opening 21 to loosen said at least part of the trachea 20' and esophagus 18' adhering to said neck 11.

After loosening these parts of trachea 20' and esophagus 18', the viscera pack including heart 16, lungs, liver, stomach, intestines 12, trachea 20 and esophagus 18 including crop 19, including the parts of the esophagus 18' and trachea 20' at the neck side of the crop may be integrally eviscerated from the vent end 8 through the vent opening 22 by an eviscerating tool.

The invention claimed is:

1. A pre-evisceration device for preparing the evisceration of beheaded slaughtered poultry having a carcass with a body cavity having a breast side and a back side, as well as a vent end where the vent is or was located, and at least part of the neck with a neck opening at a neck end thereof, the slaughtered poultry having a viscera pack including heart, lungs, liver, stomach, intestines, trachea and esophagus including crop, including a part of the esophagus and trachea at the neck side of the crop, wherein the viscera pack is to be eviscerated from the vent end,
the pre-evisceration device comprising:
a neck slitting knife for making a neck slit along the neck at the breast side of the poultry; and
a pre-evisceration release tool for releasing, prior to evisceration, said part of the esophagus and trachea at the neck side of the crop between a position adjacent the crop, at the neck side thereof, and the neck opening,
wherein the pre-evisceration release tool is adapted to be inserted via the neck slit between the esophagus and trachea and the naturally surrounding tissue, and to be moved along the neck to loosen said at least part of the trachea and esophagus adhering to said neck.

2. The pre-evisceration device according to claim 1, wherein the pre-evisceration release tool is a scraper.

3. The pre-evisceration device according to claim 1, wherein the pre-evisceration release tool is adapted to be moved from a position adjacent the crop, at the neck side thereof, along the neck to the neck opening.

4. The pre-evisceration device according to claim 1, wherein the neck slitting knife is adapted to make a slit from the neck opening in the direction of the neck towards a position on the breast essentially above the crop.

5. The pre-evisceration device according to claim 1, further comprising a neck positioning tool to position the neck at least prior to insertion of the pre-evisceration release tool, possibly prior to making the neck slit.

6. The pre-evisceration device according to claim 1, wherein the slaughtered poultry is suspended by its legs in a shackle with the neck hanging downwards.

7. The pre-evisceration device according to claim 1, wherein the slaughtered poultry further comprises wings and shoulders, and wherein the pre-evisceration device further comprises shoulder lifters to lift the shoulders prior to inserting the pre-evisceration release tool.

8. The pre-evisceration device according to claim 1, wherein multiple pre-evisceration release tools are integrated in a carrousel machine around its circumference.

9. An evisceration device comprising:
an evisceration tool for eviscerating the viscera pack from the vent end; and
the pre-evisceration device according to claim 1.

10. A method for preparing the evisceration of beheaded slaughtered poultry, comprising the step of using the pre-evisceration device according to claim 1.

11. The method according to claim 10, followed by inserting an eviscerating member into the vent end to eviscerate the viscera pack including the esophagus with the crop and the trachea.

12. The method according to claim 10, followed by removing the neck skin and/or harvesting neck meat.

13. A pre-evisceration release tool for preparing the evisceration of beheaded slaughtered poultry having a carcass with a body cavity having a breast side and a back side, as well as a vent end where the vent is or was located, and at least part of the neck with a neck opening at a neck end thereof, the slaughtered poultry having a viscera pack including heart, lungs, liver, stomach, intestines, trachea and esophagus including crop, including a part of the esophagus and trachea at the neck side of the crop, wherein the viscera pack is to be eviscerated from the vent end, and wherein the slaughtered poultry is conveyed in a shackle conveyor,
wherein the pre-evisceration release tool is suitable for releasing, prior to evisceration, said part of the esophagus and trachea at the neck side of the crop between a position adjacent the crop, at the neck side thereof, and the neck opening,
wherein the pre-evisceration release tool is adapted to be inserted via a neck slit between the esophagus and trachea and the naturally surrounding tissue, and
wherein a drive is provided to move said pre-evisceration release tool along the neck to loosen said at least part of the trachea and esophagus adhering to said neck.

14. A method for preparing the evisceration of beheaded slaughtered poultry having a carcass with a body cavity having a breast side and a back side, as well as a vent end where the vent is or was located, and at least part of the neck with a neck opening at a neck end thereof, the slaughtered poultry having a viscera pack including heart, lungs, liver, stomach, intestines, trachea and esophagus including crop, including a part of the esophagus and trachea at the neck side of the crop,
the method comprising the steps of:
making a neck slit along the neck at the breast side of the poultry;
inserting a pre-evisceration release tool via the neck slit between the esophagus and trachea and the naturally surrounding tissue; and
moving the pre-evisceration release tool along the neck, thereby loosening said at least part of the trachea and esophagus adhering to said neck between a position adjacent the crop, at the neck side thereof, and the neck opening.

15. The method according to claim 14, followed by inserting an eviscerating member into the vent end to eviscerate the viscera pack including the esophagus with the crop and the trachea.

16. The method according to claim 14, followed by removing the neck skin and/or harvesting neck meat.

\* \* \* \* \*